United States Patent [19]
Eckhardt et al.
[11] Patent Number: 4,940,555
[45] Date of Patent: Jul. 10, 1990

[54] STORAGE-STABLE ANIONIC LIQUID DETERGENT COMPOSITIONS CONTAINING AMPHOTERIC DISTYRYL DERIVATIVE FLUORESCENT WHITENERS

[75] Inventors: Claude Eckhardt, Riedisheim, France; Heinz Hefti, Reinach, Switzerland

[73] Assignee: Ciba-Geigy Corporation, Ardsley, N.Y.

[21] Appl. No.: 323,707

[22] Filed: Mar. 15, 1989

[30] Foreign Application Priority Data

Mar. 25, 1988 [CH] Switzerland ........................ 1144/88

[51] Int. Cl.[5] ........................ C09K 11/06; C11D 1/02; C11D 3/42; C11D 17/08

[52] U.S. Cl. ........................................ 252/543; 8/137; 8/648; 252/117; 252/118; 252/153; 252/173; 252/301.22; 252/545; 252/546; 252/550; 252/559; 252/DIG. 14

[58] Field of Search ............... 252/117, 118, 121, 153, 252/173, 545, 546, 543, 550, 559, 301.22, DIG. 14; 8/137, 648

[56] References Cited

U.S. PATENT DOCUMENTS

| | | | |
|---|---|---|---|
| 4,294,711 | 10/1981 | Hardy | 252/8.75 |
| 4,478,598 | 10/1984 | Meyer et al. | 8/648 |
| 4,880,433 | 11/1989 | Sutterlin | 8/182 |

OTHER PUBLICATIONS

Tech. data–Preparation 4382 (8/83) bulletin published by Ciba–Geigy.
Tech. data–Tinopal 4409 (10/84) bulletin published by Ciba–Geigy.

*Primary Examiner*—Dennis Albrecht
*Attorney, Agent, or Firm*—Kevin T. Mansfield; Edward McC. Roberts

[57] ABSTRACT

Storage-stable anionic liquid detergent compositions containing fluorescent whitening agents of the class of the amphoteric distyryls. These detergent compositions cause no bleach spots when they come in contact with textile fabric.

7 Claims, No Drawings

STORAGE-STABLE ANIONIC LIQUID DETERGENT COMPOSITIONS CONTAINING AMPHOTERIC DISTYRYL DERIVATIVE FLUORESCENT WHITENERS

The present invention relates to storage-stable anionic liquid detergents which contain amphoteric distyryl derivatives as fluorescent whitening agents.

It is known to use fluorescent whitening agents in liquid detergents. During the treatment they exhaust on to the material to be washed and, by virtue of their special light absorption/emission property, result in elimination of the yellowish hues and in an enhancement of the degree of whiteness.

However, this effect is also responsible for the appearance of bleach spots if textile fabric comes into direct contact with the liquid detergent, for example in a pretreatment. For this reason, European Patent Application No. 167 205 proposes the use of monosulfonated stilbenetriazolyl, triazine or distyrylbiphenyl whitening agents in anionic liquid detergents as a solution to this problem. It is also known to use amphoteric fluorescent whitening agents in cationic liquid detergent compositions (q.v. European Patent Application No. 59 684). The use of amphoteric fluorescent whitening agents in anionic liquid detergent compositions has so far not been disclosed. Surprisingly, it has been found that amphoteric distyryl fluorescent whitening agents can also be incorporated in anionic liquid detergents, and that it is thereby possible to prevent the formation of bleach spots and at the same time to impart excellent white effects and detergent stability.

Accordingly, the present invention relates to anionic liquid detergent compositions containing 0.01 to 2% of fluorescent whitening agent consisting of an amphoteric distyryl compound, or a mixture of distyryl compounds, of formula I

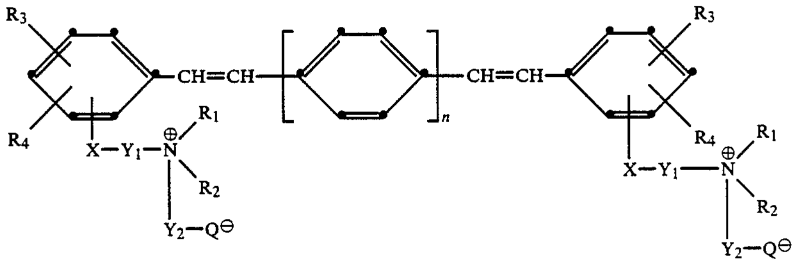

(I)

wherein

X is oxygen, sulfur, a direct bond, $-SO_2N(R_5)-$ $-CON(R_5)-$ or $-COO-$, $Y_1$ and $Y_2$ are each independently of the other $C_1$-$C_4$alkylene or hydroxypropylene, $R_1$ and $R_2$ are each independently of the other $C_1$-$C_4$alkyl or $-NR_1R_2$ is a pyrrolidine, piperidine, hexamethylenimine or morpholine ring, and $R_1$ together with $R_5$ is also a piperazine ring, $R_3$ and $R_4$ are each independently of the other hydrogen, $C_1$-$C_4$alkyl, halogen, $C_1$-$C_4$alkoxy, $C_3$-$C_4$alkenyl, $-CN$ or, in ortho-position to each other, together are a trimethylene or tetramethylene group.

$R_5$ is hydrogen, $C_1$-$C_4$ alkyl, cyanoethyl or, together with $R_1$, is a piperazine ring, Q is $-COO$ or $-SO_3$, and n is 1 or 2.

It is preferred to use amphoteric distyryl derivatives of formula II

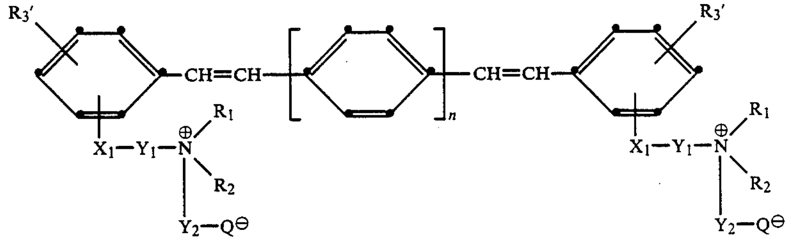

(II)

wherein $R_1$, $R_2$, $Y_1$, $Y_2$, Q and n are defined above, and $X_1$ is oxygen, a direct bond, $-CONH-$ or $-COO-$, and $R_3$ is hydrogen, $C_1$-$C_4$alkyl, methoxy or chloro.

It is especially preferred to use amphoteric distyryl derivatives of formula III

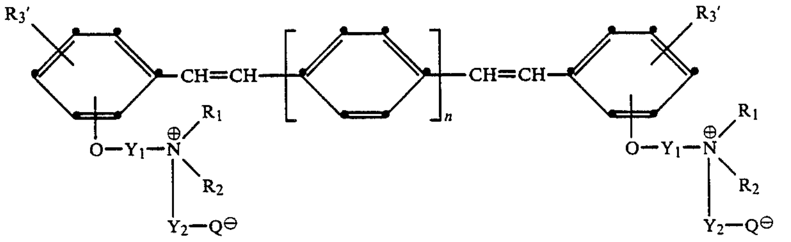

(III)

wherein $R_1$, $R_2$, $R_3'$, $Y_1$, $Y_2$ Q and n are as defined above; and, first and foremost, the amphoteric distyryl derivatives of formula IV

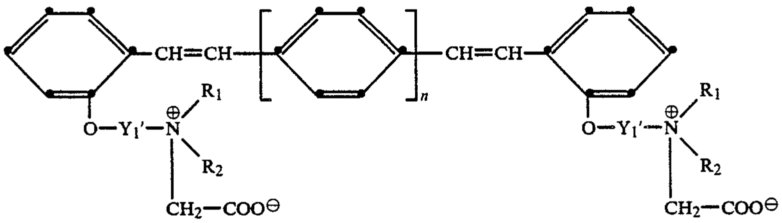

(IV)

wherein $Y_1'$, is $C_1$–$C_4$alkylene and $R_1$, $R_2$ and n are as defined above, for example the compound of formula V

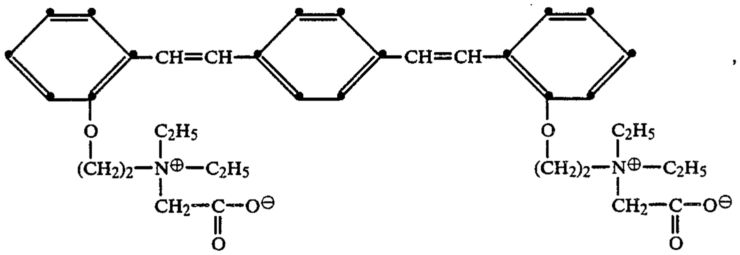

(V)

,

The amphoteric distyryl derivatives of formulae I to V are known and can be prepared by known methods (q.v. for example European Patent Applciation 59 684).

The term anionic liquid detergent compositions will be understood as meaning the known and commercially available detergent compositions of general anionic character described, for example, in European Patent Application No. 167 205 or U.S. Pat. No. 4 507 219.

In addition to the above amphoteric styryl derivatives, the liquid detergents preferably contain 1 to 60% of anionic, non-ionic, zwitterionic and, in some cases, small amounts of cationic surfactants and 25 to 65%, preferably 40 to 55%, of water. Specifically, the detergent composition contains, in addition to the fluorescent whitening agent, 3 to 50%, preferably 15 to 25%, of anionic surfactants, 2 to 30%, preferably 4 to 15%, of non-ionic surfactants, 3 to 30%, preferably 5 to 20%, of ethoxylated or non-ethoxylated ($C_{10}$–$C_{22}$) fatty acids, especially saturated ($C_{10}$–$C_{14}$) fatty acids such as capric, lauric, myristic, coconut and palm kernel fatty acid and mixtures thereof, 1 to 25%, preferably 1 to 10%, of builders and, if appropriate, 1 to 10%, preferably 1 to 5%, of zwitterionic surfactants, 0.5 to 3%, preferably 0.7 to 2%, of quaternary ammonium, amine or amine oxide surfactants and 1 to 10% of conventional detergent additives such as enzymes, enzyme stabilizers, antioxidants, preservatives and disinfectants, fragrances and dyes, complexing agents and/or sequestering agents and solvents.

Useful surfactants are described, for example, in U.S. Pat. Nos. 4,285 841, 3,929,678 and 4,284,532 and British Pat. No. 2,041,986. Anionic surfactants which may suitably be used are, for example, water-soluble salts of organic sulfur compounds which contain alkyl and/or aryl groups, sulfonic acids or sulfonic acid esters containing 10 to 20 carbon atoms in the alkyl moiety, for example alkyl sulfates, preferably those obtained by sulfation of higher ($C_{10}$–$C_{18}$) alcohols, linear or branched alkylbenzenesulfonates containing 9 to 15 carbon atoms in the alkyl moieties, preferably linear alkylbenzenesulfonates containing 11 to 14 carbon atoms in the alkyl moieties, alkanesulfonates of 8 to 24, preferably 12 to 18 carbon atoms, alkyl glyceryl ether sulfonates of 8 to 18 carbon atoms, alkyl phenol ethylene oxide ether sulfates containing 1 to 4 mol of ethylene oxide per molecule and 8 to 12 carbon atoms in the alkyl moieties, alkyl ethylene oxide ether sulfates containing 1 to 4 mol of ethylene oxide per molecule and 10 to 20 carbon atoms in the alkyl moieties, water-soluble salts or esters of a $\alpha$-sulfonated fatty acids containing 6 to 20 carbon atoms in the fatty acid and 1 to 10 carbon atoms in the ester group, water-soluble salts of 2-acyloxyalkane-1-sulfonic acid containing 2 to 9 carbon atoms in the acyl group and 9 to 23 carbon atoms in the alkane moiety, water-soluble salts of olefin sulfonates of 12 to 24 carbon atoms and $\beta$-alkoxyalkanesulfonates containing 1 to 3 carbon atoms in the alkyl moieties and 8 to 20 carbon atoms in the alkane moiety. Non-ionic surfactants which may suitably be used are, for example, ethoxylated non-ionic compounds of formula $R'(OC_2H_4)_nOH$, wherein R' is an alkyl group of 10 to 16 carbon atoms or an alkylphenyl group containing 8 to 12 carbon atoms in the alkyl moiety, n is an integer from 3 to 9, which surfactants have a HLB (hydrophiliclipophilic balance) of 10 to 13. The surfactants employed are in particular those cited as preferred in EP-A-167 205. The most eligible anionic surfactants, however, are ethoxylated or non-ethoxylated $C_{10}$–$C_{18}$alkylsalts, $C_{10}$–$C_{18}$alkylsulfates, e.g. in the form of the triethanolamine salts, $C_{10}$–$C_{14}$alkylbenzenesulfonates or mixtures thereof, and non-ionic surfactants which are preferably used are condensation products of one mol of ($C_{10}$–$C_{15}$) fatty alcohol with 3 to 8 mol of ethylene oxide.

Suitable builders are the polycarboxylated cited in U.S. Pat. Nos. 4,321,165 and 4,284,532, for example water-soluble aminopolycarboxylates, cycloalkanepolycarboxylates, ether polycarboxylates, alkylpolycarboxylates, epoxy polycarboxylates, tetrahydrofuran polycarboxylates, benzenepolycarboxylates and polyacetyl polycarboxylates, preferably the sodium and potassium salts of ethylenediaminetetraacetate, nitrilotriacetate and phytic acid, water-soluble polymers and copolymers of itaconic acid, aconitic acid, maleic acid, fumaric acid, mesaconic acid, methylmalonic acid and citraconic acid, as well as the sodium and potassium salts of mellitic acid, pyromellitic acid, benzenepentacarboxylic acid, oxydiacetic acid, carboxymethoxysuccinic acid, carboxymethoxymalonic acid, cis-cyclohexanehexacarboxylic acid, cis-cyclopentanetetracarboxylic acid, oxydisuccinic acid and, most preferably, citric acid and citrates.

The liquid detergent compositions are prepared by simple mixing of the individual components and are used for washing and pretreating textile fabrics.

The liquid detergent compositions of this invention are stable for several months and cause no bleach spots when they come in contact with textile fabrics.

The following Examples will serve to illustrate the invention. Parts and percentages are by weight. The spotting test is carried out in the following manner:

Spotting test (a) Whitening agent/detergent formulation:

0.1% (100% of active substance) of fluorescent whitening agent or mixture of fluorescent whitening agents is dissolved in a liquid detergent. 0.6 g of this detergent solution (A) is diluted with 400 ml of water (10°-12° dH) at a temperature of 30° C. (detergent solution B).

(b) A piece of bleached cotton fabric (20 g) is clamped on a stenter frame.

(c) 0.6 ml of detergent solution (A) is applied uniformly with a pipette to a premarked round area (5 cm diameter) of this cotton fabric which, after a treatment time of 30 seconds, is put into the prepared detergent solution (B) and washed for 15 minutes at 30° C. The cotton fabric is then rinsed with cold water and dried at 70° C.

(d) The difference in the degree of whiteness according to Ganz between the treated area and the surrounding area is a criterion of the so-called spotting behaviour (formation of bleach spots) and is determined by inspecting the textile fabric.

EXAMPLE 1

A bleached cotton fabric is washed at a liquor to goods ratio of 1:20 for 15 minutes in a warm aqueous liquor of 60° C. that contains, per liter, 3 g of one of the following liquid detergent solutions (a), (b) or (c) and 0.1% of a fluorescent whitening agent of formula

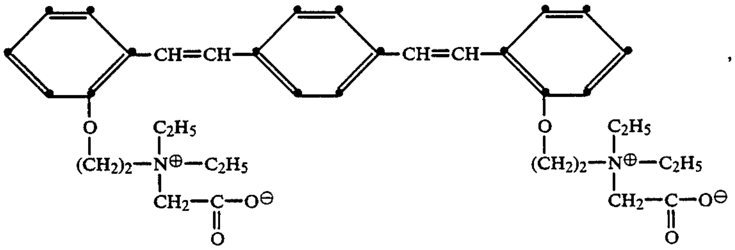
(1)
,

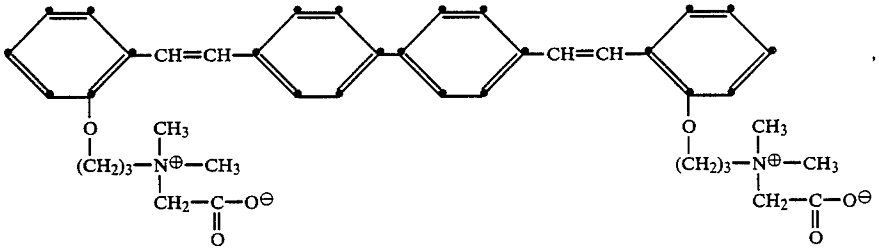
(2)
,

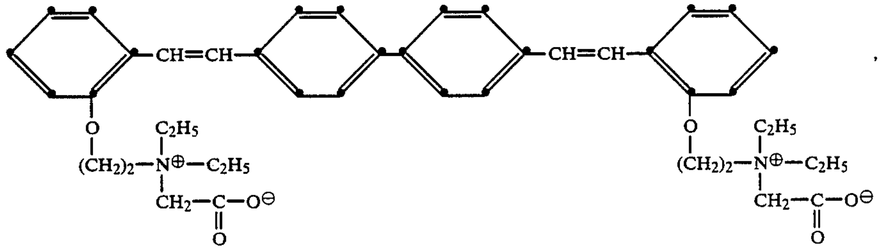
(3)
,

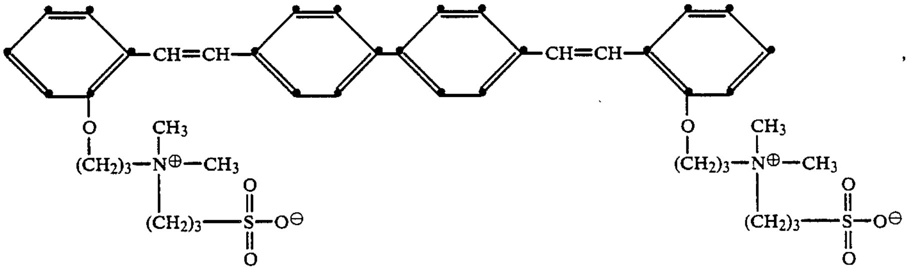
(4)
, or

-continued

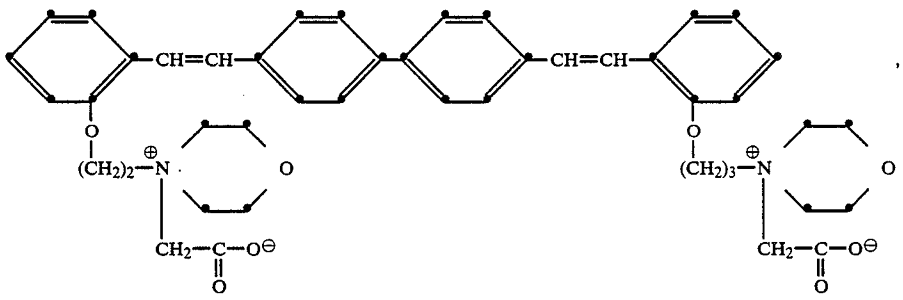

(5) , based on said detergent solution. The cotten fabric is then rinsed for 20 seconds in running water and dried at 70? C. in a drying oven. The treated fabric exhibits an excellent white efect even after repeating the washing procedure 5 to 10 times.

The liquid detergent employed is prepared by mixing the following components (% by weight):

| | | |
|---|---|---|
| (a) | 15% | of $C_{11}$-$C_{13}$ alkylbenzenesulfonate |
| | 14% | of $C_{14}$-$C_{15}$ fatty alcohol polyethoxylate (ethylene oxide 7) |
| | 10% | of soap flakes |
| | 9% | of ethanol |
| | 4% | of sodium citrate |
| | 5% | of triethanolamine |
| | 43% | of water. |
| (b) | 7.5% | of $C_{13}$ alkylbenzenesulfonate |
| | 12% | of $C_{14}$-$C_{15}$ alkylpolyethoxysulfonate (ethylene oxide 2.25) |
| | 15% | of $C_{11}$-$C_{13}$ fatty acid potassium salt |
| | 10% | of $C_{12}$-$C_{13}$ fatty alcohol polyethoxylate (ethylene oxide 8) |
| | 5.5% | of sodium citrate |
| | 12% | of a 1:1 mixture of isopropyl alcohol and ethanol |
| | 0.7% | of $C_{12}$ alkyltrimethylammonium chloride |
| | 37.3% | of water. |
| (c) | 11.5% | of $C_{11}$-$C_{13}$ alkylbenzenesulfonate |
| | 3.8% | of triethanolamine lauryl sulfonate |
| | 15.5% | of potassium soap |
| | 15% | of $C_{11}$-$C_{15}$ fatty alcohol polyethoxylate (ethylene oxide 7) |
| | 5% | of triethanolamine |
| | 10% | of ethanol |
| | 39.2% | of water. |

EXAMPLE 2

The spotting test is carried out with compounds of formulae 1-5 and the respective liquid detergent composition (a), (b) or (c). All compounds are stable for several months in the three detergent compositions, have good whitening properties, and induce no, or only insignificant, spotting.

What is claimed is:

1. An anionic liquid detergent composition containing 1 to 60% of an anionic surfactant and 0.01 to 2% of a fluoroescent whitening agent consisting of an amphoteric distyryl compound, or a mixture of distyryl compounds, of formula I

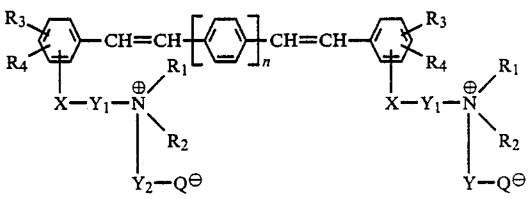

(I)

wherein

X is oxygen, sulfur, a direct bond, $-SO_2N(R_5)$, $-CON(R_5)$ or $-COO-$, $Y_1$ and $Y_2$ are each independently of the other $C_1$-$C_4$alkylene or hydroxypropylene, $R_1$ and $R_2$ are each independently of the other $C_1$-$C_4$alkyl or $-NR_1R_2$ is a pyrrolidine, piperadine, hexamethylenimine of morpholine ring, and $R_1$ together with $R_3$ is also a piperazine ring, $R_3$ and $R_4$ are each independently of the other hydrogen, $C_1$-$C_4$alkyl, halogen, $C_1$-$C_4$alkoxy, $C_3$-$C_4$alkenyl, $-CN$ or, in ortho-position to each other, together are a trimethylene or tetramethylene group, $R_5$ is hydrogen, $C_{1-4}$alkyl, cyanoethyl or, together with $R_1$ is a piperazine ring, Q is $-COO$ or $-SO_3$, and n is 1 or 2.

2. An anionic liquid detergent composition according to claim 1, which contains amphoteric distyryl fluoroescent whitening agents of formula II

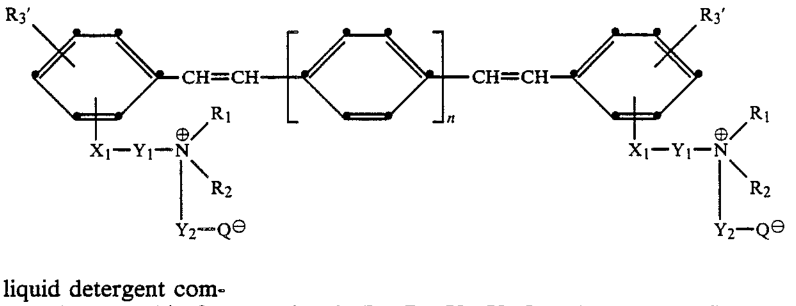

(II)

wherein $R_1$, $R_2$, $Y_1$, $Y_2$ Q and n are as defined above, and $X_1$, is oxygen, a direct bond, $-CONH-$ or $-COO-$, and $R_3$ is hydrogen, $C_1$-$C_4$alkyl, methoxy or chloro.

3. An anionic liquid detergent composition according to claim 2, which contains amphoteric distyryl fluoroescent whitening agents of formula iii

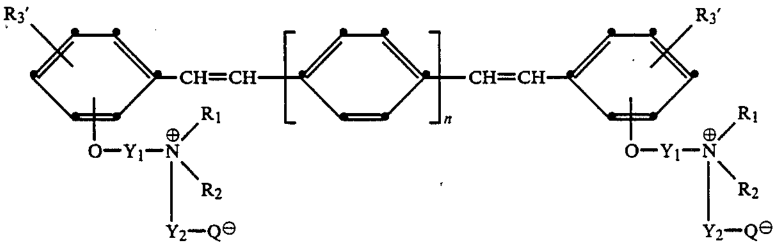

(III)

wherein $R_1$, $R_2$, $R_3'$, $Y_1$, $Y_2$, Q and n are as defined in claim 2.

4. An anionic liquid detergent composition according to claim 2, which contains amphoteric distyryl fluorescent whitening agents of formula IV

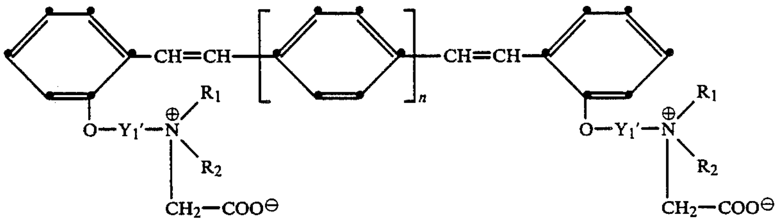

(IV)

wherein $Y_1'$, is $C_1$-$C_4$alkylene and $R_1$, $R_2$ and n are as defined in claim 2.

5. An anionic liquid detergent composition according to claim 2, which contains a distyryl fluoroescent whitening agent of formula V

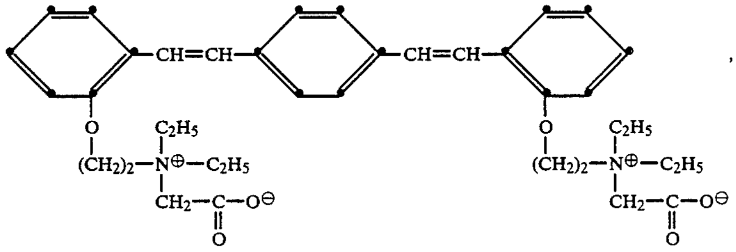

(V)

,

6. An anionic liquid detergent composition according to claim 2, which contains a distyryl fluorescent whitening agent of formula

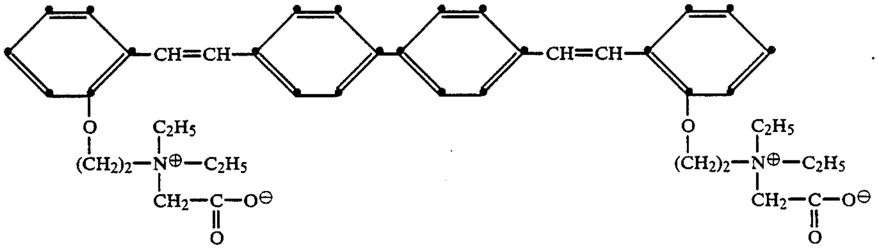

.

7. A process for washing and pretreating textile fabrics, which comprises contacting said fabrics with an aqueous solution containing an effective amount of an anionic liquid detergent composition as claimed in claim 1.

* * * * *